United States Patent
Batistic (12)

(10) Patent No.: US 6,295,499 B1
(45) Date of Patent: Sep. 25, 2001

(54) METHOD OF IMPROVING ABS CONTROL BEHAVIOR

(75) Inventor: Ivica Batistic, Frankfurt am Main (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/230,136

(22) PCT Filed: Apr. 25, 1997

(86) PCT No.: PCT/EP97/02137

§ 371 Date: Apr. 28, 2000

§ 102(e) Date: Apr. 28, 2000

(87) PCT Pub. No.: WO98/03381

PCT Pub. Date: Jan. 29, 1998

(30) Foreign Application Priority Data

Jul. 18, 1996 (DE) .............................. 196 28 972

(51) Int. Cl.[7] ................ B60T 8/00; B60T 8/24; B60T 8/50
(52) U.S. Cl. ................ 701/72; 701/78; 303/167
(58) Field of Search .................. 701/71, 72, 78, 701/73; 303/167, 146, 147, 157, 158

(56) References Cited

U.S. PATENT DOCUMENTS

| | | | |
|---|---|---|---|
| 4,844,557 | * 7/1989 | Giers | 303/140 |
| 5,272,636 | * 12/1993 | Buschmann et al. | 701/72 |
| 5,302,010 | * 4/1994 | Ehmer et al. | 303/147 |
| 5,312,169 | * 5/1994 | Buschmann | 303/140 |
| 5,494,344 | * 2/1996 | Heyn et al. | 303/140 |

FOREIGN PATENT DOCUMENTS

| | | |
|---|---|---|
| 33 45 729 | 6/1985 | (DE) . |
| 34 13 738 | 10/1985 | (DE) . |
| 39 05 045 | 8/1990 | (DE) . |
| 42 34 819 | 4/1993 | (DE) . |
| 43 32 820 | 3/1995 | (DE) . |
| 196 22 839 | 12/1996 | (DE) . |
| 195 22 632 | 1/1997 | (DE) . |
| 195 22 634 | 1/1997 | (DE) . |

OTHER PUBLICATIONS

Publication from Bosch Technische Berichte—Antiblockiersystem (ABS) by Von Heinz Leiber et al. 1980.

Article from ATZ Automobiltechnische Zentschrift 98 (1996)—Bremsanlage und Schlupfregelungs–systeme der neuen Baureihe 5 von BMW by Kurz et al.

Article from ATZ Automobiltechnische Zentschrift 97 (1995)—Bremsanlage und Schlupf–Regelsysteme der neuen 7er–Reihe von BMW by Leffler et al.

\* cited by examiner

*Primary Examiner*—Michael J. Zanelli
(74) *Attorney, Agent, or Firm*—Rader, Fishman & Grauer PLLC

(57) ABSTRACT

To improve the steerability and driving stability in a curve, in an automotive vehicle furnished with an anti-lock control system, a special control mode is initiated upon identifying a cornering situation. In special circumstances, errors in identification may be unavoidable. To overcome the disadvantageous effects of such an identification in error, in the practice of the invention, re-acceleration ($a_i$) of wheel (i) from which pressure is erroneously relieved is analyzed and brake pressure applied as long as an acceleration threshold value ($a_{limit1,2}$) is exceeded.

3 Claims, 1 Drawing Sheet

METHOD OF IMPROVING ABS CONTROL BEHAVIOR

BACKGROUND OF THE INVENTION

The present invention relates to a method of improving the control behavior of an anti-lock control system, in particular, of improving the steerability of the automotive vehicle and the driving stability during cornering, wherein a vehicle reference speed is derived from the rotating behavior of the wheels of the automotive vehicles and criteria are obtained for identifying a cornering situation and the curve direction, and once a cornering situation is identified, the standard control mode is replaced by a special or curve control mode which already in the partial deceleration area causes a direct or a indirect reduction in brake pressure on the front wheel at the inner side of the curve and/or on the rear wheel at the inner side of the curve.

DE 34 13 738 C2 already discloses an anti-lock control system provided with a system for identifying a cornering situation also based on wheel slip measurement. To identify a cornering situation, the slip values on the wheels at one vehicle side are summed up and compared to the slip values on the wheels at the other vehicle side, generating a cornering identification signal as soon as the difference of the summed-up slip values exceeds a predetermined threshold value. Upon identification of a cornering situation, selective criteria, such as "select-low" or "select high" according to which the course of pressure in the individual brake pressure control channels of the said brake system is controlled, and threshold values for rendering the said selective criteria effective, are varied. In this way, the control will be adjusted to the varying conditions during straight-forward driving and during cornering.

DE 21 19 590 A1 teaches to generate a cornering identification signal with the aid of a lateral accelerometer, such as a mercury switch.

Moreover, it is already known in the art to extend the functions of an anti-lock control system by employing the system for improving the driving stability or deceleration stability in the curve. For this purpose, during Cornering or during a partial deceleration, i.e. in a deceleration process in which the threshold of response to the anti-lock control system is not achieved, a stabilizing moment about the vertical axis of the vehicle is created by specifically delaying the brake pressure build-up on the wheels at the inner side of the curve compared to the brake pressure on the wheels on the outer side of the curve ("Bremsanlage und Schlupf-Regelsystem der neuen 7-er Reihe von BMW" (Brake System and Slip Control System of the new BMW No. 7 series); ATZ 97 (1995), pp. 8–15, and "Bremsanlage und Schlupf-Regelsysteme der neuen Baureihe 5 von BMW" (Brake System and Slip Control Systems of the new BMW No. 5 series); ATZ 98 (1996), pp. 188–194. The information on the actual steering angle is derived—if no steering angle sensor is used—from the lateral acceleration which, in turn, is calculated from the wheel sensor signals.

Now, it is the object of the invention to avoid, in a control system exclusively evaluating the wheel rotating signals also for cornering identification, the disadvantageous effects of "errors in identification". For, exclusive reliance on the signals generated by the number of revolutions of the wheel may result in situations favoring errors in identification. This applies, for example, to cornering on :-split, i.e. on a varying right/left coefficient of friction if the inner side of the curve has a high coefficient of friction, while the outer side of the curve has a low coefficient of friction. In that situation, a stabilizing step interfering with the wheel allegedly on the inner side of the curve, could cause a destabilizing moment of yaw.

SUMMARY OF THE INVENTION

This object is achieved by a method involving that, upon initiation of the special control mode, re-acceleration of the wheel whose brake pressure was reduced as a result of the special control, i.e. of that wheel which, erroneously, was identified as a wheel located at the inner side of the curve, is analyzed for detecting such an error in identification. Once re-acceleration of the said wheel exceeds a predetermined threshold value, brake pressure is fed into the wheel brake of the said wheel as long as the threshold value is exceeded.

It has proved to be advantageous to dimension the duration of the brake pressure application for eliminating the undesired effects of an error in identification in accordance with the formula $$t_{DAi} = k_i^* (a_i - a_{limit1})$$

wherein $a_{limit1}$ is between 2 g and 5 g, e.g. 4 g.

According to another embodiment relating to a control system wherein the brake pressure, in case of control, is applied in pulses by opening an inlet valve, it has proved to be advantageous to increase the brake pressure in addition to the brake pressure share dimensioned according to the aforementioned formula, by a predetermined amount. For, the pressure build-up pulse joining the first pressure build-up pulse, is extended by an additional period of time determined by the second threshold value, namely $$t_{DAi} = k_2^* (a_i - a_{limit2})$$

wherein $a_{limit2}$ is between 1.5 g and 2.5 g. The brake pressure deficit on the wheel at the allegedly inner side of the curve developed as a result of the error in identification, in this way, is rapidly overcome without affecting to the stability of the control.

Further details, advantages and end-use applications of the invention will become manifest from the following description of an embodiment with reference to the enclosed flow chart.

BRIEF DESCRIPTION OF THE DRAWING

The afore-mentioned flow chart schematically shows a section from the control or program pattern of an anti-lock control system.

DETAILED DESCRIPTION OF THE DRAWING

Figure 1:
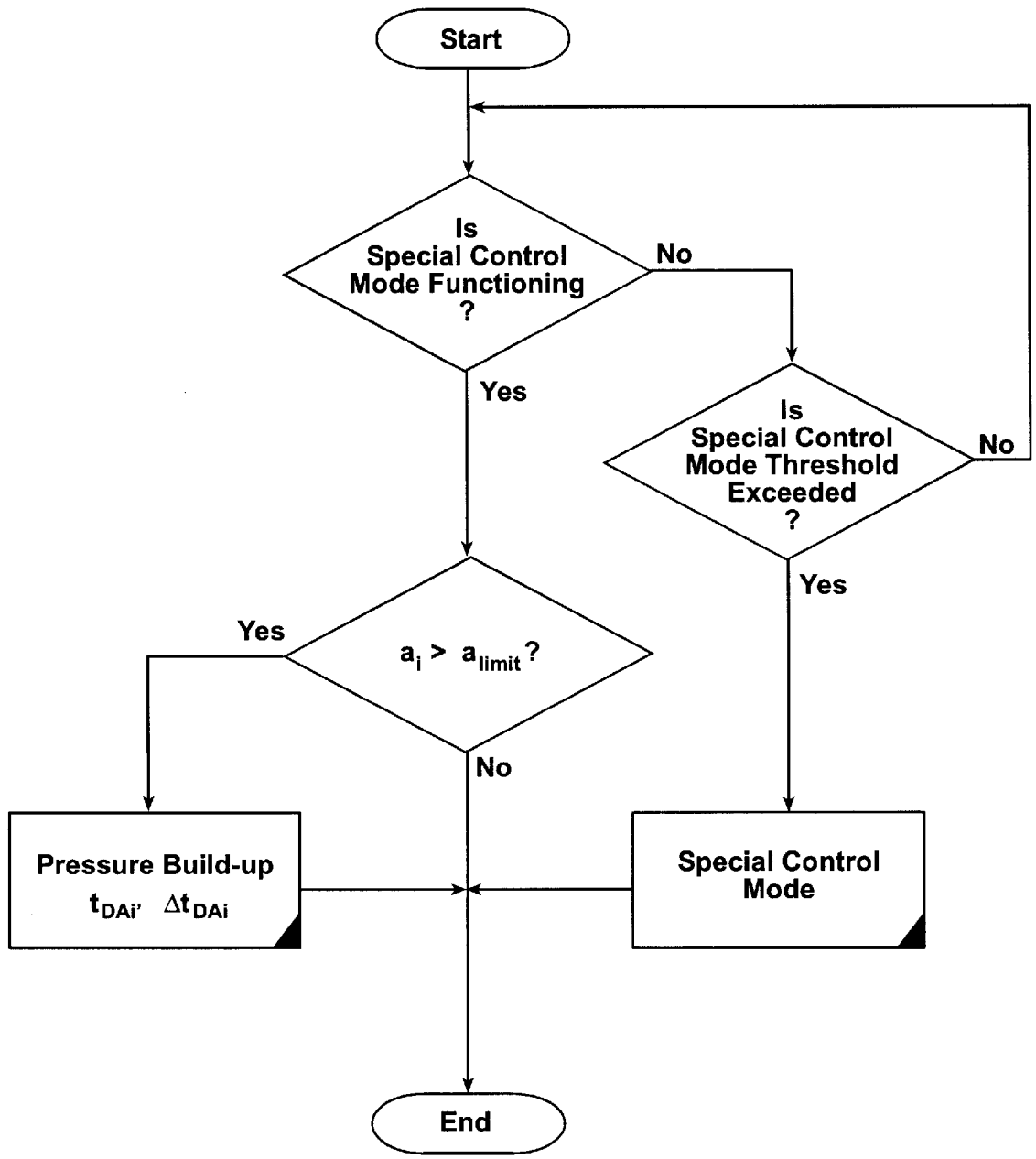

The control or program pattern shown is the program section in which the method of the invention has been implemented and which has an impact on the course of control. Hence, the example relates to an anti-lock control system involving a program structure. In a controlled system having a permanent wiring, the individual method steps could, of course, be realized by corresponding logical circuits.

After the sub-program having been started it is determined in a first decision-making step whether the special control mode has already been initiated, thereby performing a stabilizing step. For, in identifying a cornering situation, in a control method of the type presently under consideration, a stabilizing moment of yaw about the vertical axis of the automotive vehicle to balance cornering is generated by relieving pressure on the wheels at the inner side of the curve. If the control is initiated during a partial deceleration, the brake pressure on the wheels at the outer side of the curve is kept constant or boosted automatically by preventing a further brake pressure build-up on the wheel(s) at the inner side of the curve.

If the special control mode is already operative, the YES-output of branch 1 will determine the continued course of process. Re-acceleration $a_i$ of the wheel is analyzed. Once the relevant re-acceleration threshold value $a_{grenz}$ is exceeded, pressure is applied as long as such threshold is exceeded, via the YES-output of the branch 2, to the wheel brake of the wheel which was erroneously identified as the wheel on the inner side of the curve and from which, for this reason, pressure was relieved by the special control. The said pressure build-up for rectifying the error in identification is symbolized by a function block 3 in the flow chart as shown.

As already set out, the said pressure application is composed of a permanent share dimensioned in accordance with the formula $$t_{DAi}=k_1*(a_i-a_{limit1})$$

wherein i=1 . . . 4
and of an additional share $$t_{DAi}=k_2*(a_i-a_{limit2})$$

wherein $a_{limit2}$ is between 1.5 g and 2.5 g.

The said additional share has an effect on the pressure build-up in the pressure build-up pulse following the first applying pulse.

In a given embodiment, a value of 2 g has been selected for $a_{limit2}$. Values $k_1$ and $k_2$ are conversion factors. Index i is indicative of that the said pressure application is calculated and performed for each individual wheel; hence, the letter i marks the respectively pressure-relieved wheel identified to be the wheel of the automotive vehicle on the inner side of the curve.

The brake pressure application for removing the erroneous pressure relief, basically, should be concluded as soon as possible. Conversely, an excessive application of pressure, again, requiring a subsequent pressure decrease, should, feasibly, be avoided.

Moreover, the flow chart conveys, that in an interrogation step 4, via the NO-output of branch 1, it is determined whether a curve has been identified and the thresholds for initiation of the special control mode have been exceeded. If the threshold values have been exceeded, the standard control mode of the anti-lock control system is switched to the special control mode as symbolized by function 5.

As already set out hereinbefore, errors in identification in a control system deriving each and every information from the rotating behavior of the wheels, in certain circumstances may be unavoidable. However, the method of the invention is able to eliminate, in a simple way, the effects of such errors in identification before a destabilizing moment of yaw can develop or before an extended stopping distance can occur as a consequence of the erroneous pressure relief.

What is claimed is:

1. A method of improving the control behavior of an anti-lock system of a four-wheel, two-axle vehicle, comprising the steps of:

measuring individual wheel speeds;

deriving a vehicle reference speed;

obtaining criteria for identifying a cornering situation and the direction of the curve from the rotating behavior of the vehicle wheels;

upon identifying a cornering situation, in lieu of a standard control mode, initiating a special control mode which already in a partial braking range causes a reduction of brake pressure on at least one wheel;

upon initiation of the special control mode, analyzing re-acceleration of the at least one wheel, to determine an "error in identification"; and applying brake pressure to the at least one wheel as long as re-acceleration of the at least one wheel exceeds a predetermined threshold value.

2. A method according to claim 1, wherein the period during which brake pressure is applied, is dimensioned in accordance with the formula $$t_{DAi}=k_1*(a_i-a_{limit1}),$$

wherein i=1 . . . 4
with a threshold value $a_{limit1}$ in the range of between 2 g and 5 g being selected for the re-acceleration $a_i$.

3. A method according to claim 1, wherein the brake pressure in the event of special control is applied by pulse-wise actuating and opening an electrically actuable inlet valve, and the duration of the brake pressure application in a first pressure build-up pulse is dimensioned in accordance with the formula $$t_{DAi}=k_1*(a_i-a_{limit1}),$$

wherein i=1 . . . 4
with a first threshold value $a_{limit1}$ in the range of between 2 g and 5 g being selected for the re-acceleration $a_i$ of the at least one wheel, and that a pressure build-up pulse following the first pressure build-up pulse triggered at a first re-acceleration above the first threshold value $a_{limit1}$ is extended by an additional time span $t_{DAi}$ determined by a second threshold value $a_{limit2}$, wherein $$t_{DAi}=k_2*(a_i-a_{limit2}),$$

and $a_{limit2}$ is in the range between 1.5 g and 2.5 g.

* * * * *